United States Patent [19]
Kinter et al.

[11] Patent Number: 5,789,741
[45] Date of Patent: Aug. 4, 1998

[54] DETECTING PLANTS IN A FIELD BY DETECTING A CHANGE IN SLOPE IN A REFLECTANCE CHARACTERISTIC

[75] Inventors: Malcolm L. Kinter, Sunnyvale; James L. Beck, Los Gatos, both of Calif.

[73] Assignee: Patchen, Inc., Los Gatos, Calif.

[21] Appl. No.: 740,592

[22] Filed: Oct. 31, 1996

[51] Int. Cl.$^6$ .................... G01J 5/30; H01J 40/14
[52] U.S. Cl. ............... 250/226; 250/222.1; 47/1.7; 209/582
[58] Field of Search .............. 250/226, 221.1, 250/559.38; 47/1.7; 356/406, 407, 416, 420, 425; 239/77, 79; 209/580, 581, 582

[56] References Cited

U.S. PATENT DOCUMENTS

| | | | |
|---|---|---|---|
| 2,514,405 | 7/1950 | Marihart | 250/239 |
| 2,682,132 | 6/1954 | Marihart | 47/1 |
| 2,894,178 | 7/1959 | Chesebrough et al. | 317/130 |
| 3,373,870 | 3/1968 | Black et al. | 209/111.6 |
| 3,488,511 | 1/1970 | Mori et al. | 250/226 |
| 3,512,587 | 5/1970 | Shader | 172/57 |
| 3,590,925 | 7/1971 | Troutner | 176/6 |
| 3,609,913 | 10/1971 | Rose | 47/1.43 |
| 3,652,844 | 3/1972 | Scott, Jr. | 240/1 |
| 3,701,218 | 10/1972 | Priest | 47/1.43 |
| 3,821,550 | 6/1974 | Priest | 250/226 |
| 3,910,701 | 10/1975 | Henderson et al. | 356/39 |
| 4,013,875 | 3/1977 | McGlynn | 235/150.2 |
| 4,015,366 | 4/1977 | Hall, III | 47/1 |
| 4,029,391 | 6/1977 | French | 350/96 |
| 4,092,800 | 6/1978 | Wayland, Jr. et al. | 47/1.3 |
| 4,179,216 | 12/1979 | Theurer et al. | 356/4 |
| 4,206,569 | 6/1980 | Randolph | 47/1.7 |
| 4,354,339 | 10/1982 | Nokes | 56/10.2 |
| 4,369,886 | 1/1983 | Lane et al. | 209/564 |

(List continued on next page.)

FOREIGN PATENT DOCUMENTS

| | | |
|---|---|---|
| 231270 | 11/1984 | Germany . |
| 229625 | 6/1989 | New Zealand . |
| 203340 | 12/1967 | U.S.S.R. . |
| 471074 | 6/1973 | U.S.S.R. . |
| 382367 | 8/1973 | U.S.S.R. . |
| 547183 | 4/1977 | U.S.S.R. . |
| 968631 | 4/1981 | U.S.S.R. . |
| 1377606 A1 | 2/1988 | U.S.S.R. . |
| 590598 | 7/1947 | United Kingdom . |
| 2 200 446 | 8/1988 | United Kingdom . |
| WO 84/00211 | 1/1984 | WIPO . |
| WO 89/12510 | 12/1989 | WIPO . |

OTHER PUBLICATIONS

Proceedings of the 1991 Symposium, American Society of Agricultural Engineers, W. L. Felton et al., "A Microprocessor Controlled Technology To Selectively Spot Spray Weeds", 8 pages (Dec. 16–17 1991).

B. B. Nitsch et al., "Visible And Near Infrared Plant, Soil And Crop Residue Reflectivity For Weed Sensor Design", Paper No. 913006, (Jun. 23–26, 1991).

(List continued on next page.)

*Primary Examiner*—Edward P. Westin
*Assistant Examiner*—Kevin Pyo
*Attorney, Agent, or Firm*—Skjerven, Morrill, MacPherson, Franklin, and Friel; T. Lester Wallace

[57] ABSTRACT

An agricultural implement (for example, a spray device) differentiates living plants growing in a field from background materials (such as soil) by detecting a change in slope of a reflectance characteristic of objects in a field of view. By using a change in slope of the reflectance characteristic, a small percentage of living plant material in the field of view can be detected and the agricultural implement need not be calibrated to a particular background material. In some embodiments, if the change in slope is determined to exceed a predetermined threshold amount, then it is determined that a weed likely exists in the field of view and a solenoid-operated spray valve is opened at the appropriate time to spray the entire area (including the weed) that was in the field of view with herbicide.

19 Claims, 12 Drawing Sheets

U.S. PATENT DOCUMENTS

| | | | |
|---|---|---|---|
| 4,482,960 | 11/1984 | Pryor | 364/424 |
| 4,527,897 | 7/1985 | Okabe | 356/407 |
| 4,550,526 | 11/1985 | Smucker | 47/1.5 |
| 4,558,786 | 12/1985 | Lane | 209/558 |
| 4,618,257 | 10/1986 | Bayne et al. | 356/71 |
| 4,626,993 | 12/1986 | Okuyama et al. | 364/424 |
| 4,628,454 | 12/1986 | Ito | 364/424 |
| 4,630,773 | 12/1986 | Ortlip | 239/1 |
| 4,674,048 | 6/1987 | Okumura | 364/424 |
| 4,699,273 | 10/1987 | Suggi-Liverani et al. | 209/580 |
| 4,709,265 | 11/1987 | Silverman et al. | 358/109 |
| 4,744,207 | 5/1988 | Hanley et al. | 56/16.6 |
| 4,768,713 | 9/1988 | Roper | 239/77 |
| 4,768,715 | 9/1988 | Sali et al. | 239/166 |
| 4,878,598 | 11/1989 | Ruschhaupt, Jr. | 222/1 |
| 5,015,868 | 5/1991 | Park | 250/561 |
| 5,021,645 | 6/1991 | Satula et al. | 250/223 |
| 5,050,771 | 9/1991 | Hanson et al. | 222/1 |
| 5,068,540 | 11/1991 | Tsuji | 250/561 |
| 5,072,128 | 12/1991 | Hayano et al. | 250/572 |
| 5,109,161 | 4/1992 | Horiuchi et al. | 250/561 |
| 5,222,324 | 6/1993 | O'Neall et al. | 47/1.7 |
| 5,237,386 | 8/1993 | Harley | 356/338 |
| 5,278,423 | 1/1994 | Wangler et al. | 250/561 |
| 5,296,702 | 3/1994 | Beck et al. | 250/226 |
| 5,319,196 | 6/1994 | Cleven | 250/231.13 |
| 5,386,285 | 1/1995 | Asayama | 356/356 |
| 5,389,781 | 2/1995 | Beck et la. | 250/226 |
| 5,507,115 | 4/1996 | Nelson | 47/1.7 |
| 5,585,626 | 12/1996 | Beck et al. | 250/222.1 |

OTHER PUBLICATIONS

Geoffrey J. Shropshire et al., *"Fourier and Hadamard Transforms For Detecting Weeds in Video Images"*, pp. 1–18, Paper No. 89–7522, (Dec. 12–15, 1989).

Geoffrey J. Shropshire et al., *"Optical Reflectance Sensor for Detecting Plants"*, SPIE vol. 1379, pp. 222–235, (1990).

*"Selective Sprayer"*, Cotton Farming, 1 page, (Jul. 1995 ?).

*"Sucker Punch"*, California Farmer, p. 18 (Feb. 1995).

*"A New Age of Weed Control"*, Kelly Baron, The Grower, pp. 20–24 (Feb. 1993).

*"Weedseeker"*, Patchen On Target, 4 pages (Fall 1994).

*"The Newest Weedseeker is a Hit"*, Patchen On Target, 4 pages, (Spring 1995).

*"Waging War on Weeds"*, Grape Grower, Marni Katz, Vol. 27, No. 9, 4 pages (Sep. 1995).

Patchen On Target, 4 pages, (Winter 1993).

Patchen On Target, 4 pages (Spring 1994).

Patchen Selective Spray Systems, *"Reduced Herbicide Usage is Perennial Crops, Row Crops, Fallow Land and Non–Agricultural Applications Using Optoelectronic Detection"*, 10 pages, (1994).

KEY TO FIG. 9

DETECTING PLANTS IN A FIELD BY DETECTING A CHANGE IN SLOPE IN A REFLECTANCE CHARACTERISTIC

FIELD OF THE INVENTION

The present invention relates to the optical detection of plants in a field.

BACKGROUND INFORMATION

Consider a situation where a field has been tilled and a crop planted. Some stubble from the past harvested crop is exposed. Only weeds have sprouted. It may be desirable to kill the weeds at this stage in the growing cycle by an application of herbicide. The population of weeds is sparse, but because the location of the plants is not known to the spray machinery, the entire field must be sprayed. Considerable amounts of expensive herbicide would be sprayed onto the background (bare soil and stubble) and wasted just so that a few weeds could be killed. Such blanket spraying is expensive and may involve undesirable environmental impact. Techniques are thereby sought to reduce the amount of herbicide wasted.

FIG. 1 is a diagram representative of the reflectance characteristics of a living plant 1 and two possible types of background, soil 2 and a dry leaf 3. It is seen that the slope of the illustrated reflectance characteristic in the 670 nm to 750 nm range for the living plant differs from the slopes of the background materials in the 670 nm to 750 nm range. This difference can be used to differentiate weeds from the background.

A spray device transmits radiation of a first wavelength (for example, 670 nm) and a second wavelength (for example, 750 nm) onto objects in a field of view. The device detects the percentage of incident radiation reflected at each of the two wavelengths and generates a phase indicative of the ratio of the reflectivities at the two wavelengths. If the phase is indicative of a background material reflectivity ratio, then the device does not open a solenoid-operated spray valve and does not spray the objects with herbicide. If, on the other hand, the phase is indicative of a plant reflectivity ratio, then the device opens the solenoid-operated spray valve and sprays herbicide onto the objects. See U.S. Pat. No. 5,296,702 for further details on such a spray device.

The field of view of such a spray device may, however, be significantly larger than the size of a weed to be sprayed. Radiation reflecting off objects in the field of view may reflect off plants in the field of view as well as background materials. The reflectivity of the field of view is therefore a composite reflectivity and the phase can range from a phase indicative of 0% plant to a phase indicative of 100% plant. It is desired to be able to detect a low density of weeds (for example, 5%) in the field of view so that the entire area corresponding with the field of view can be sprayed to kill these weeds.

To achieve this sensitivity, the spray device is set to spray when the phase from the field of view is only slightly more indicative of a plant than the background phase. Different background materials, however, have somewhat different reflectivities. FIG. 1, for example, indicates that the ratio of the reflectivities at 670 nm and 750 nm for a dry leaf (about 24/36=0.66) is different from the ratio of the reflectivities at 670 nm and 750 nm for soil (about 17/21=0.81). To achieve the desired sensitivity to detect low densities of weeds in the field of view, the spray device is calibrated to the particular background material in the field. If a detected phase differs from the calibrated phase by a small predetermined amount, then the presence of weeds is indicated.

Such a background calibration step, however, may introduce problems. The background material may differ in different parts of the field necessitating frequent recalibration. Also, it is possible that the calibration will be inaccurate. In the situation where a spray implement has many such spray devices with many fields of view, the fields of view of all the spray devices may involve a significant area. It may be difficult to position the spray implement such that only background material is in the fields of view of all the spray devices at one time. If a weed were to be present in one of the fields of view during calibration, then the corresponding spray device would be incorrectly calibrated not to spray such a weed when the spray device is later operating in the field.

A sensitive spray device that can differentiate weeds from background is therefore sought which does not require background calibration.

SUMMARY

An agricultural implement (for example, a spray device) differentiates living plants in a field from background materials (such as soil) by detecting a change in slope of a reflectance characteristic. By using a change in slope of a reflectance characteristic of objects in a field of view of the agricultural implement, a small percentage of living plant material in the field of view can be detected and the agricultural implement need not be calibrated to a particular background material. In some embodiments, if the change in slope exceeds a predetermined threshold amount, then it is determined that a plant (for example, a weed) likely exists in the field of view and this information is used to perform a selected activity. In some embodiments, a solenoid-operated spray valve is opened at the appropriate time to spray the entire area (including the weed) that was in the field of view with herbicide.

This summary does not purport to define the invention. The invention is defined by the claims.

BRIEF DESCRIPTION OF THE DRAWINGS

FIGS. 7A, 7B, 8A, 8B, 9A-1, 9A-2, 9B-1 and 9B-2 are circuit diagrams of a specific embodiment of a spray device.

DETAILED DESCRIPTION OF THE PREFERRED EMBODIMENTS

Figure 1:
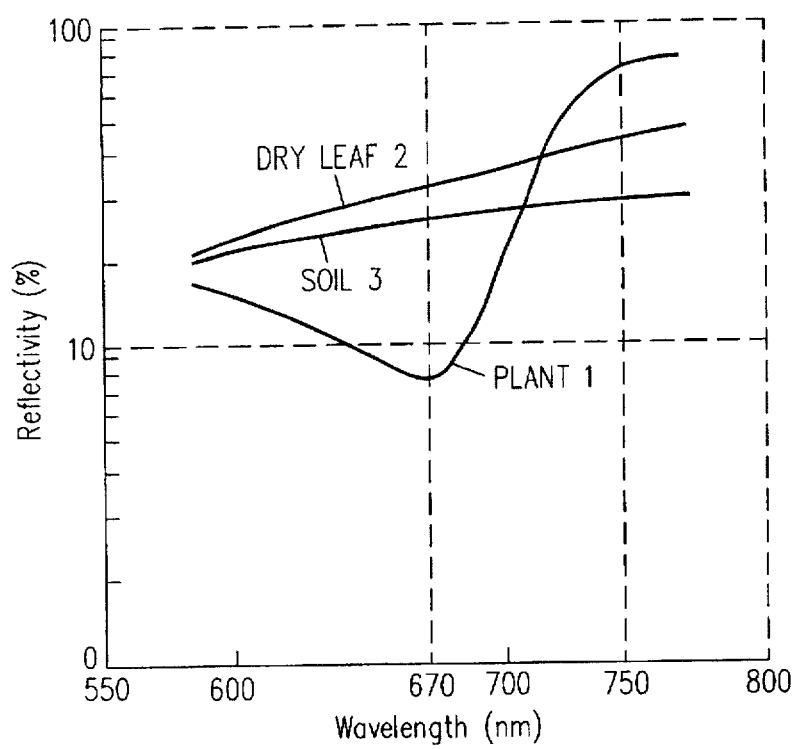
FIG. 1 is a diagram representative of the reflectance characteristics of a living plant 1 and two possible types of background, soil 2 and a dry leaf 3.
Figure 2:
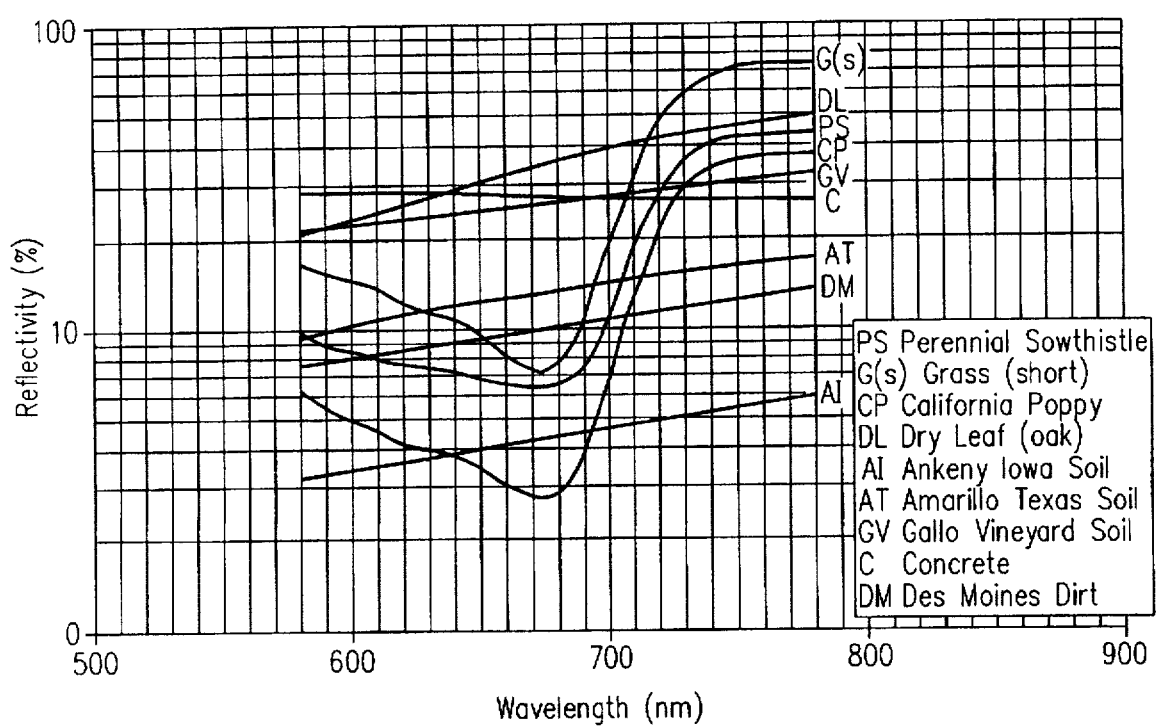
FIG. 2 is a diagram representative of reflectance characteristics of three types of living plants and six types of background materials.

FIG. 2 is a diagram representative of reflectance characteristics of three types of living plants (short grass designated G(s), perennial Sowthistle designated PS, and California Poppy designated CP) and six possible types of background materials (dry leaf designated DL, Ankeny Iowa soil designated AI, Amarillo Texas soil designated AT, Gallo Vineyard soil designated GV, concrete designated C, and Des Moines Iowa dirt designated DM). The vertical axis is percent reflectivity plotted on a log scale. The horizontal axis is wavelength in nanometers (nm).

Figure 3:
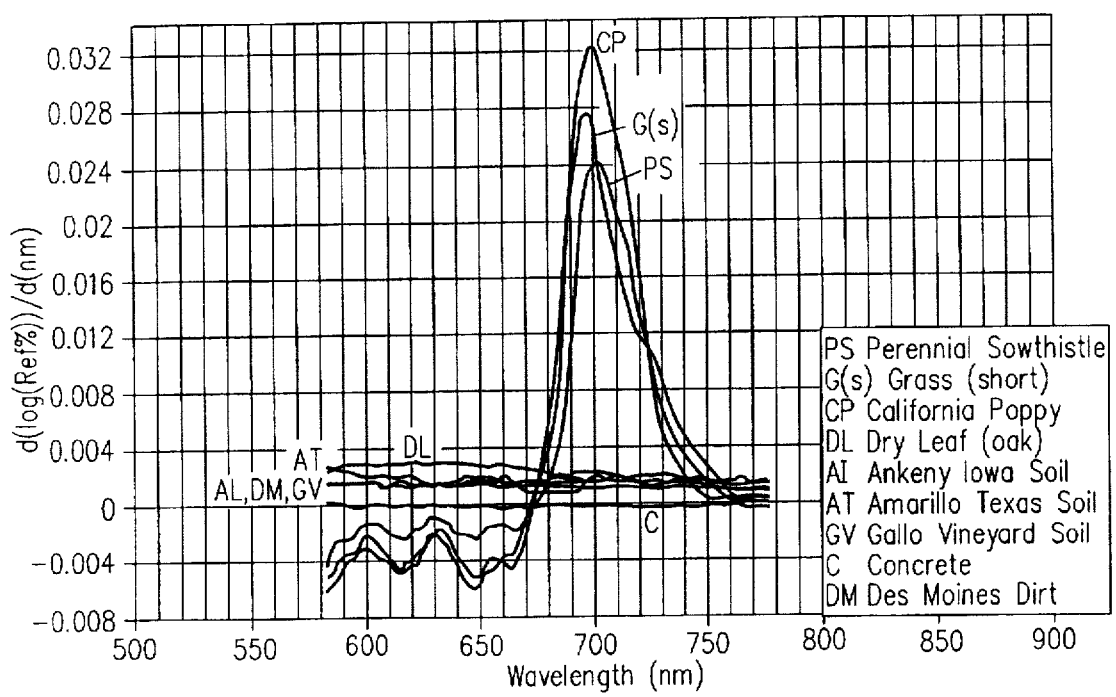
FIG. 3 is a diagram of slope versus wavelength for the reflectance characteristics of FIG. 2.

FIG. 3 is a diagram of slope versus wavelength for the reflectance characteristics of FIG. 2. The vertical axis is the derivative of the log of the percent reflectivity with respect to wavelength. The horizontal axis is wavelength in nanometers (nm). As can be seen, the graphs of the slopes of the reflectance characteristics of the living plants have peaks at about 700 nm and stand out from the relatively flat graphs of the slopes of the background materials.

For living plants, the slopes are generally negative at wavelengths of 600 nm to about 670 nm. The slopes then increase to be positive and have their highest slopes at about 700 nm. The slopes of the background materials, on the other hand, have slopes that are only slightly positive and do not change significantly over the range of 600 nm to 700 nm. One embodiment of the present invention uses such differences in slope of reflectance characteristics to differentiate plants from soil.

Figure 5:
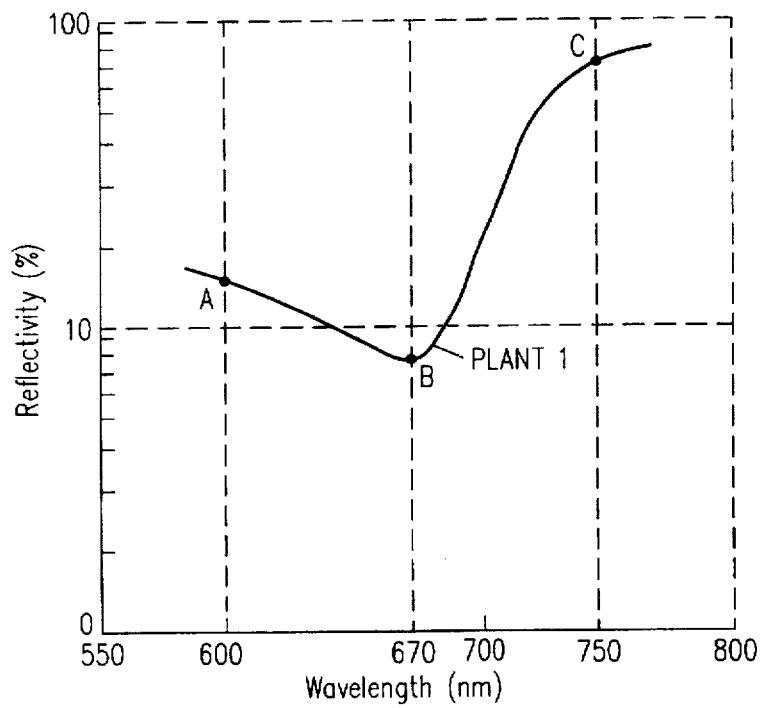
FIG. 5 is a diagram illustrating three points A, B and C on a reflectance characteristic corresponding with three reflectivity values A, B and C in accordance with an embodiment of the present invention when the material in the field of view is 100 percent living plant material.
Figure 4:
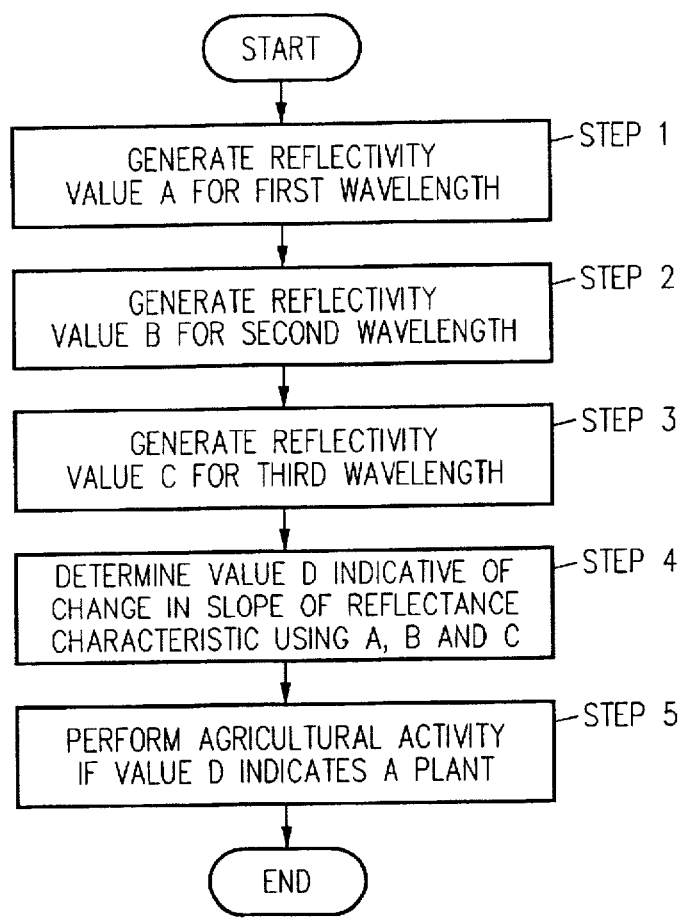
FIG. 4 is a flow chart illustrating a method in accordance with the present invention.

FIG. 4 is a flow chart illustrating a method in accordance with the present invention. In step 1, a reflectivity value A is generated for a first wavelength. Substantially monochromatic radiation of the first wavelength from a first source may be modulated as set forth in U.S. Pat. No. 5,296,702 (the subject matter of which is incorporated herein by reference) and directed onto objects in a field of view. This first wavelength may, for example, be 600 nm and the radiation source may be a plurality of light emitting diodes. Radiation that reflects off objects in the field of view may be received, filtered and processed to attenuate ambient sunlight and to generate a value indicative of the intensity of radiation of the first wavelength that reflected off the objects in the field of view. This value may then be divided by a value indicative of the intensity of the radiation transmitted onto the objects in the field of view to generate a reflectivity value A. If, for example, there were only grass in the field of view, then reflectivity value A would be indicative of a point A illustrated in FIG. 5. It is to be understood that this is but one possible way to generate the reflectivity value A indicative of a point on the reflectance characteristic of the objects in the field of view. Others are possible.

In step 2, a reflectivity value B is generated for a second wavelength in similar fashion to the way the first reflectivity value A is generated. The second wavelength may, for example, be 670 nm. If, for example, there were only grass in the field of view, then reflectivity value B would be indicative of a point B illustrated in FIG. 5.

In step 3, a reflectivity value C is generated for a third wavelength in similar fashion to the way the first and second reflectivity values are generated. The third wavelength may, for example, be 750 nm. If, for example, there were only grass in the field of view, then reflectivity value C would be indicative of a point C illustrated in FIG. 5.

In step 4, the reflectivity values A, B and C are used to determine a value D indicative of a change in slope of the composite reflectance characteristic of the objects in the field of view. In one embodiment, a value D1 indicative of the slope of the reflectance characteristic in the range of 600 nm to 670 nm is determined. Value D1 in this embodiment is B–A. Similarly, a value D2 indicative of the slope of the reflectance characteristic in the range of 670 nm to 750 nm is determined. Value D2 in this embodiment is C–B. Value D in this embodiment is D2–D1. For the reflectance characteristic in FIG. 5, value A may be 15, value B may be 7 and value C may be 70. Value D would therefore be 71.

Figure 6:
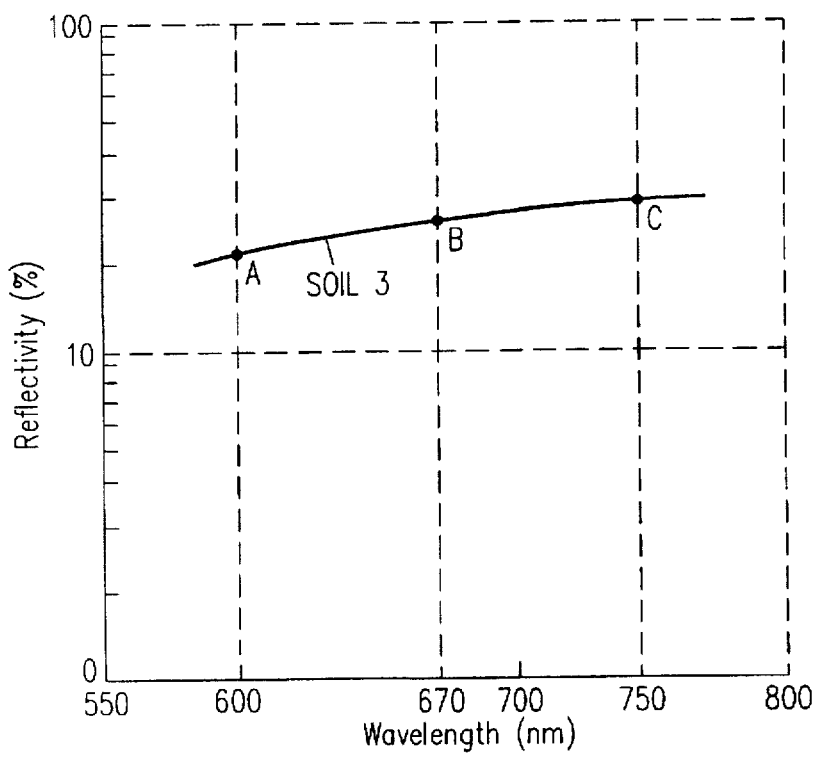
FIG. 6 is a diagram illustrating three points A, B and C on a reflectance characteristic corresponding with three reflectivity values A, B and C in accordance with an embodiment of the present invention when the material in the field of view is 100 percent background material.

FIG. 6 illustrates a reflectance characteristic of one possible background material, Gallo Vineyard soil. If there were only such soil in the field of view, then reflectivity value A would be indicative of point A in FIG. 6, reflectivity value B would be indicative of point B in FIG. 6, and reflectivity value C would be indicative of point C in FIG. 6. Value A may be 11, value B may be 12 and value C may be 12. Value D would therefore be –1.

In step 5, an agricultural activity is performed if the value D indicates a plant. In some embodiments, any value of D exceeding a predetermined threshold value (for example, 10) is determined to be indicative of a plant. If, for example, the agricultural activity is an application of herbicide, then a value of D of greater than the predetermined threshold value would cause a solenoid-operated spray valve to be opened at the appropriate time such that the objects are sprayed with herbicide. The closer the predetermined threshold value is to the D of the background materials, the more sensitive the spray device is to weeds in the field of view. In some embodiments, the spray device us coupled to a speed sensor. As the spray device is moved across the field, the output of the speed sensor is used to determine when to open the spray valve such that the objects that were in the field of view are sprayed. See U.S. Pat. No. 5,296,702 for additional details.

Note that the changes in slope as shown in FIG. 3 (as opposed to the slopes themselves as shown in FIG. 2) for the different types of background materials are roughly identical over the range of 600 nm to 750 nm. Accordingly, the values of D for different background materials will be roughly the same. A spray device operating in accordance with this method therefore need not be calibrated to the background material. There may be numerous such spray devices fixed to a supporting member of an agricultural implement wherein each of the spray devices transmits radiation onto a field of view, detects reflected radiation, determines the value D and controls a solenoid-operated spray valve. Such an agricultural implement may be moved through the field by a tractor or other farm vehicle. See U.S. patent application Ser. No. 08/664,600, entitled "High Speed Solenoid Valve Cartridge For Spraying An Agricultural Liquid In A Field", filed Jun. 17, 1996, by Malcolm L. Kinter (the subject matter of which is incorporated herein by reference) for details on a solenoid-operated spray valve.

In some embodiments, reflectivity values need not be determined in order to determine a change in slope in the reflectance characteristic. In accordance with the teachings set forth in U.S. Pat. No. 5,296,702, radiation of two wavelengths can be transmitted onto an object and the reflected radiation detected to generate a signal having a phase. This phase is indicative of the relative reflectivities of the object to the two wavelengths. No reflectivity value per se is determined. For an example of detector circuity, see U.S. patent application Ser. No. 08/705,381, entitled "Photodetector Circuit For An Electronic Sprayer", filed Aug. 28, 1996, by James L. Beck and Malcolm L. Kinter (the subject of which is incorporated herein by reference).

In accordance with some embodiments, radiation of a first wavelength and a second wavelength is transmitted onto objects in the field of view and the reflected radiation is detected to generate a signal having a first phase indicative of the relative reflectivities of the objects in the field of view for the first and second wavelengths. Also, radiation of the second wavelength and a third wavelength is transmitted onto the objects in the field of view and the reflected radiation is detected to generate a signal having a second phase indicative of the relative reflectivities of the objects in the field of view for the second and third wavelengths. The difference between the first and second phases is used as an indication of the change in slope of the reflectance characteristic of the objects in the field of view.

In some embodiments, four reflectivity values are generated and used. In one embodiment, a first reflectivity value A for a first wavelength and a second reflectivity value B for a second wavelength are generated. Using reflectivity values A and B, a value D1 indicative of a slope of a reflectance characteristic between the first and second wavelengths is generated. Also, a third reflectivity value C for a third wavelength and a fourth reflectivity value C1 for a fourth wavelength are generated. Using reflectivity values C and C1, a value D2 indicative of a slope of the reflectance characteristic between the third and fourth wavelengths is generated. A value D indicative of a change in slope of the reflectance characteristic is then generated using D1 and D2. In one embodiment, value D is D2–D1.

Figure 7A:
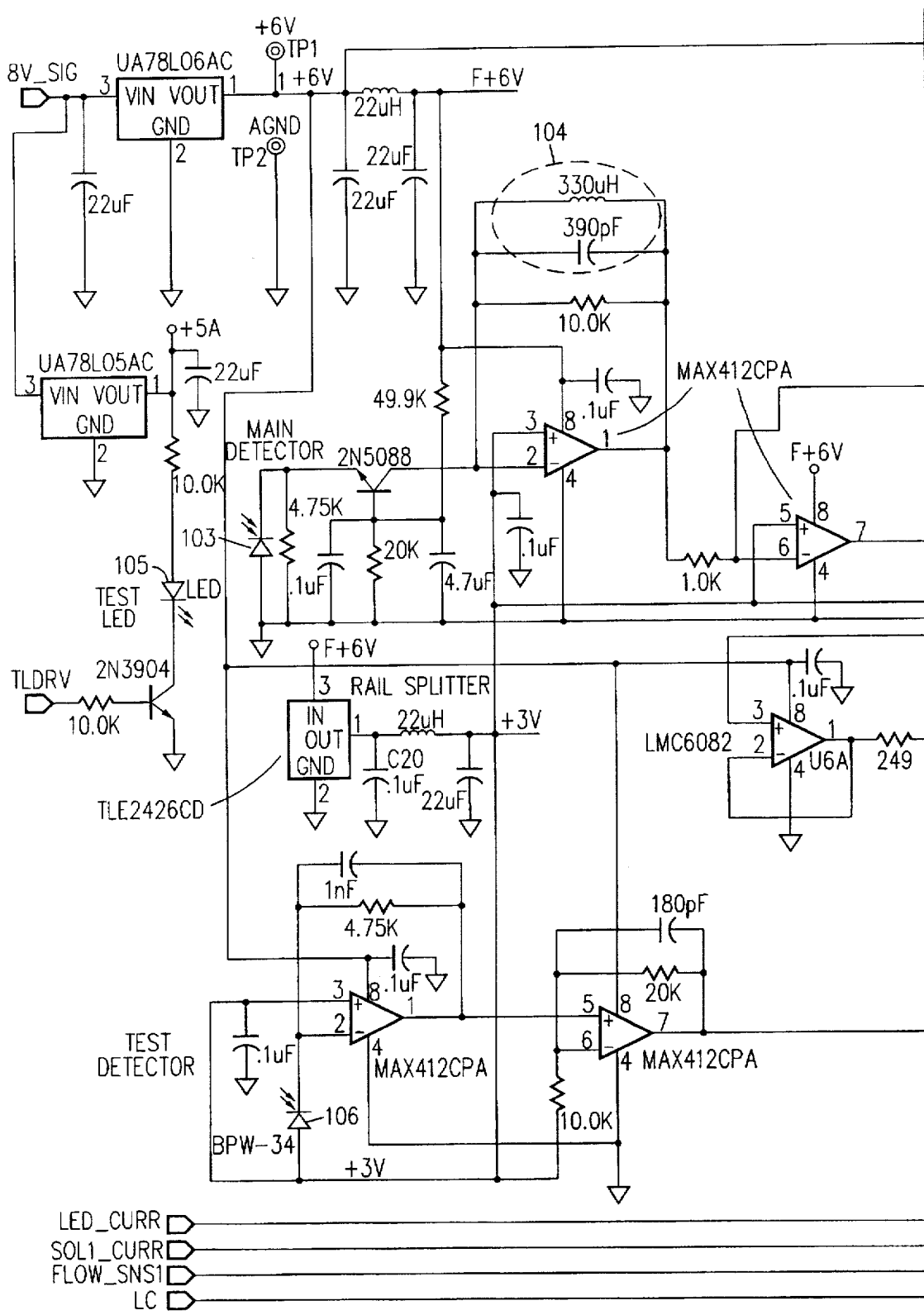
Figure 7B:
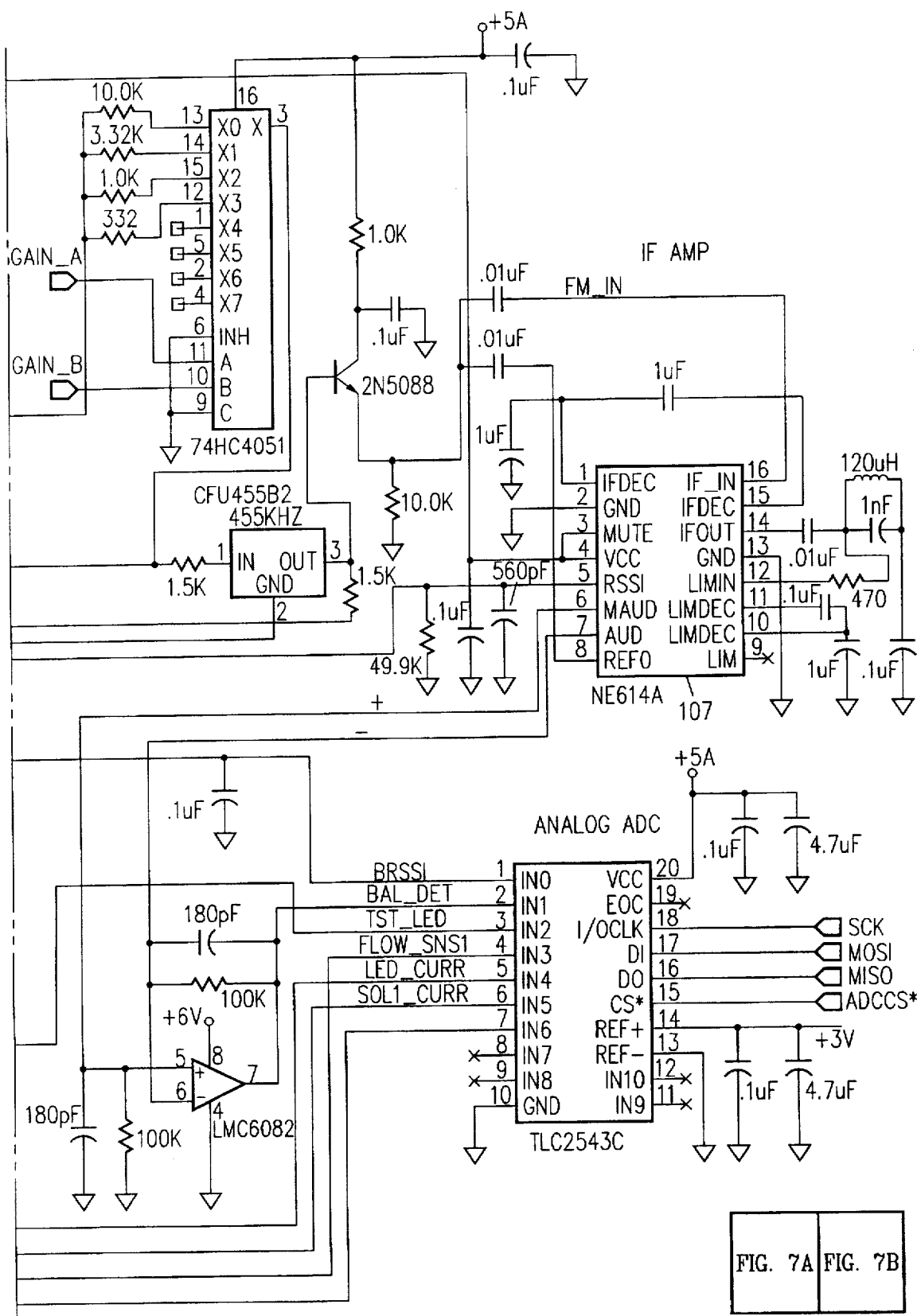
Figure 8A:
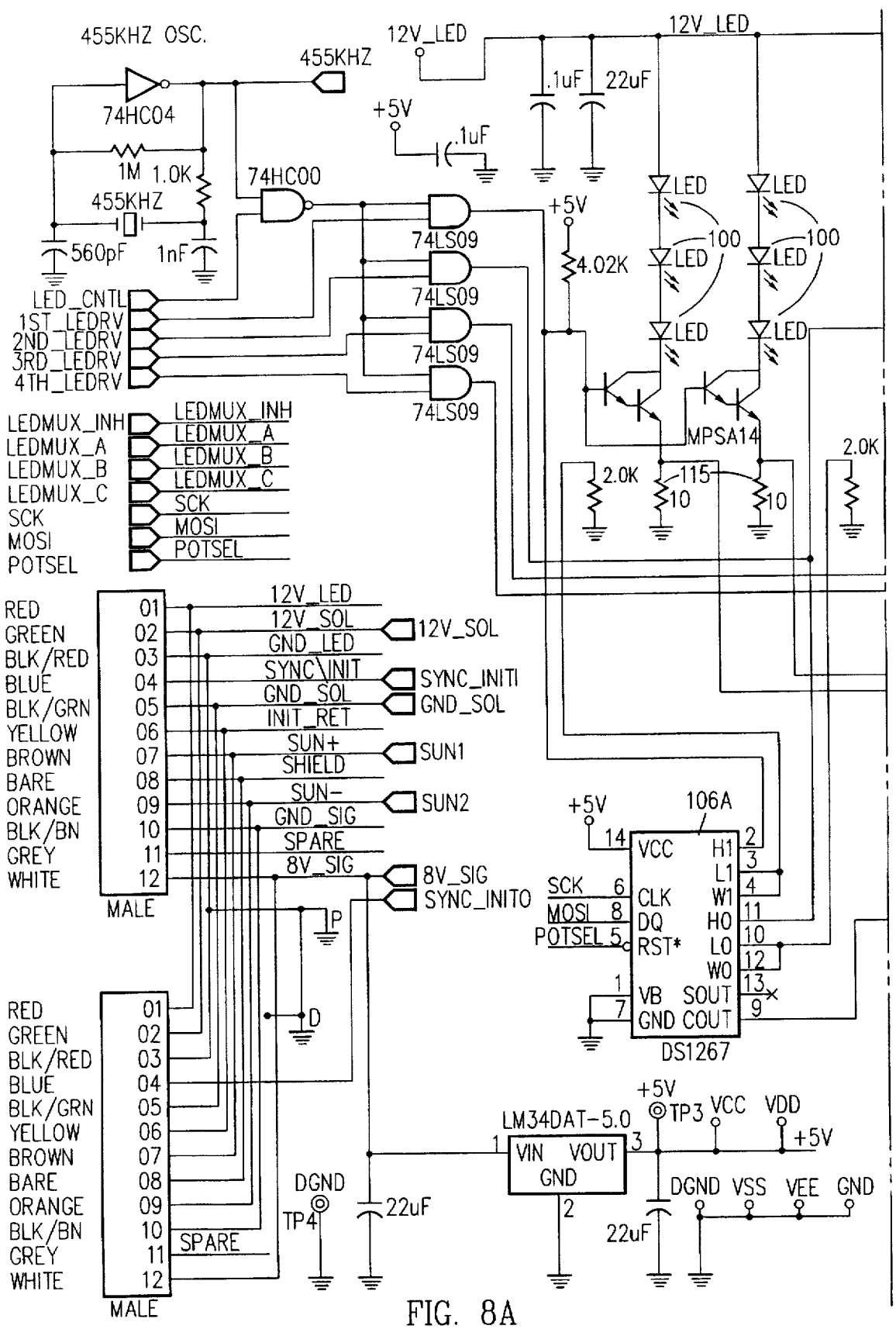
Figure 8B:
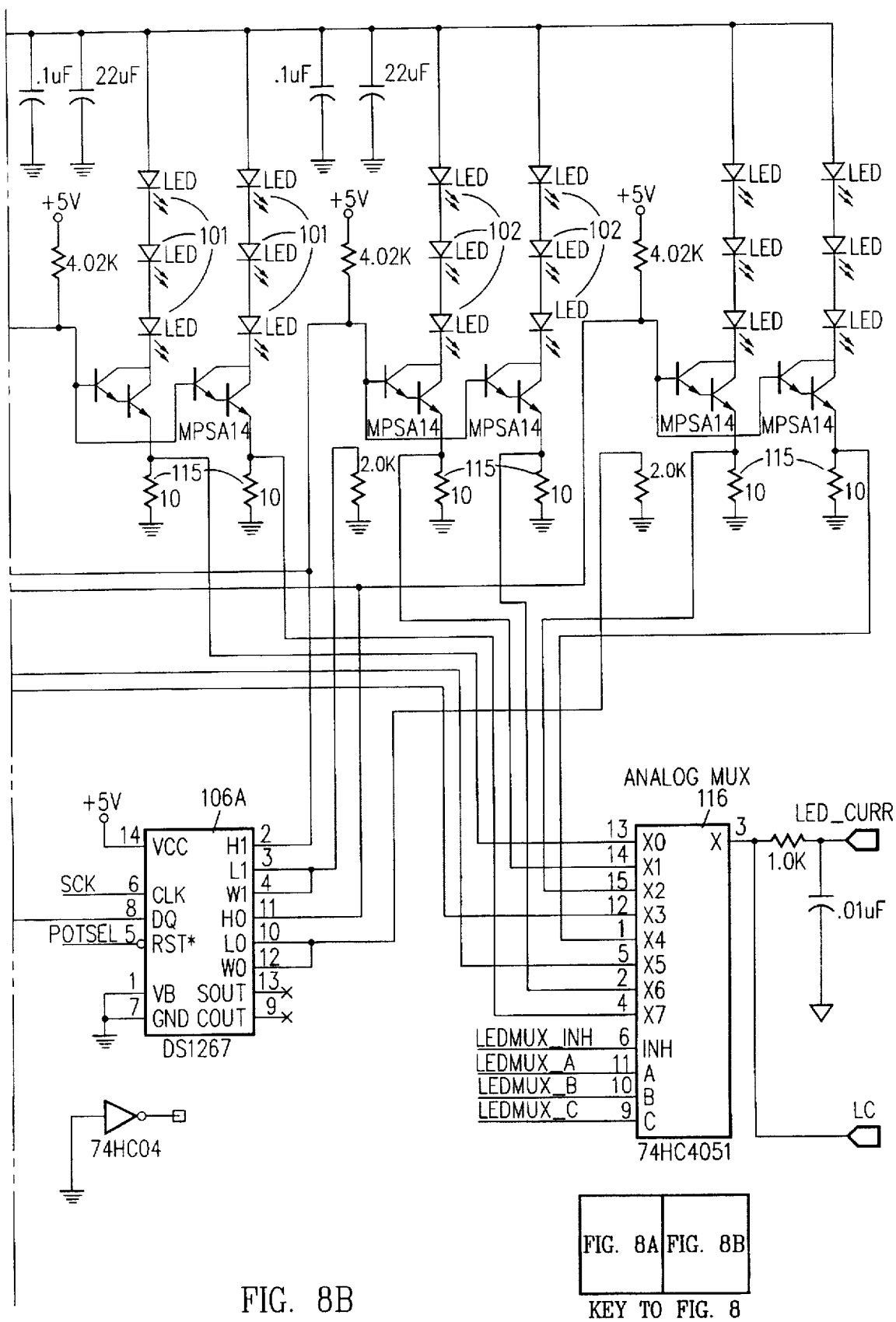
Figure 9A:
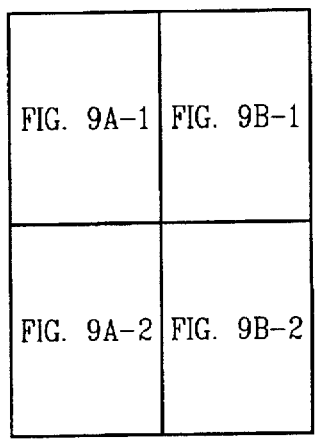
Figure 1:
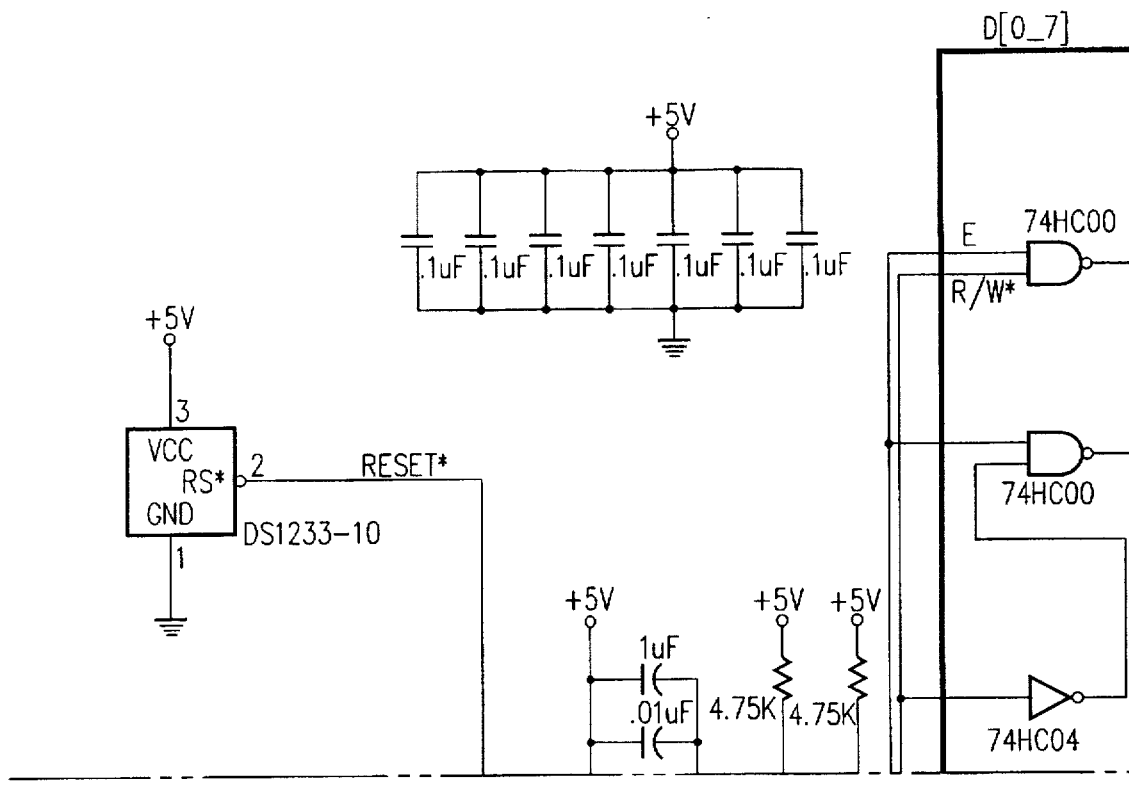
Figures 2, 9A:
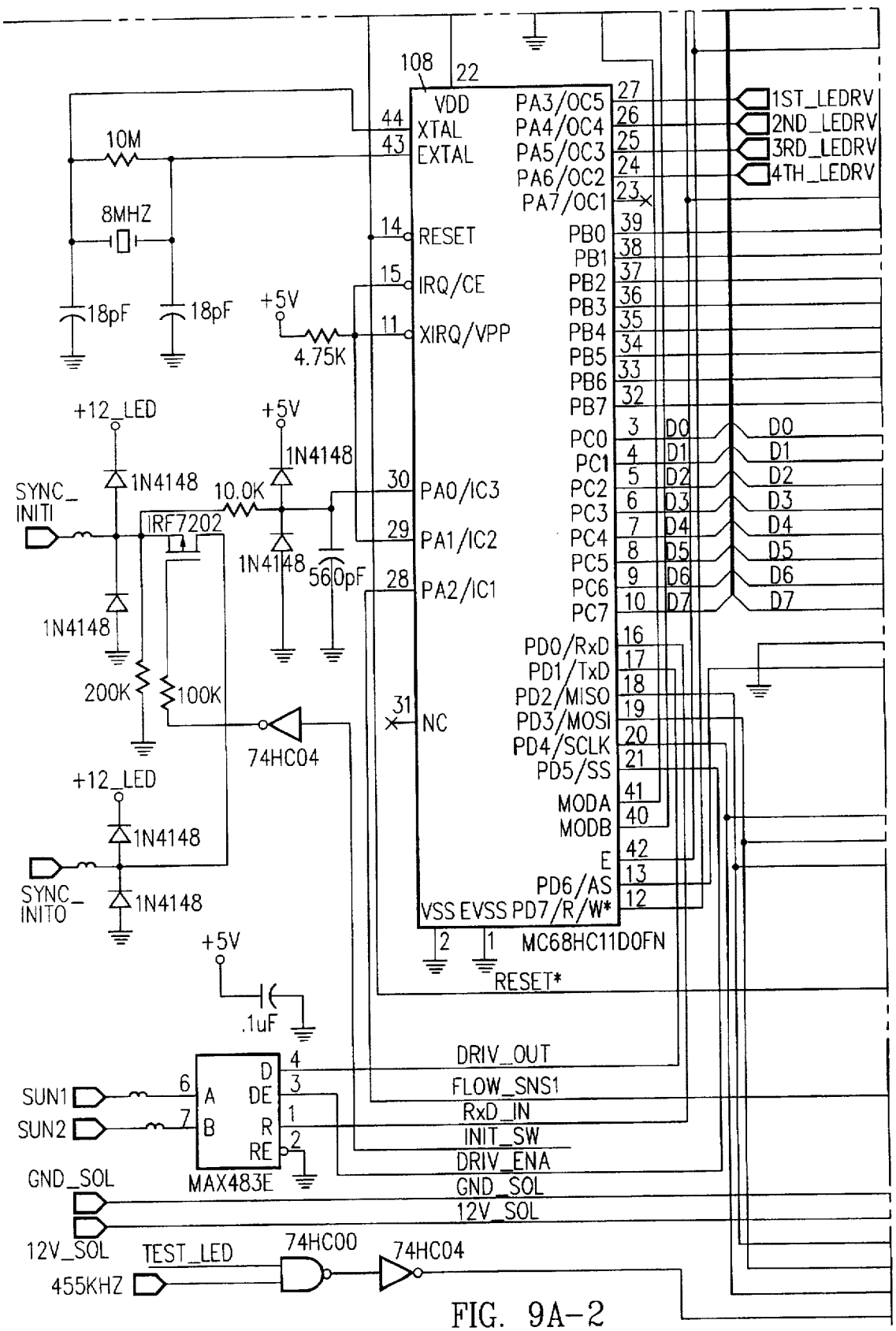
Figures 1, 9B:
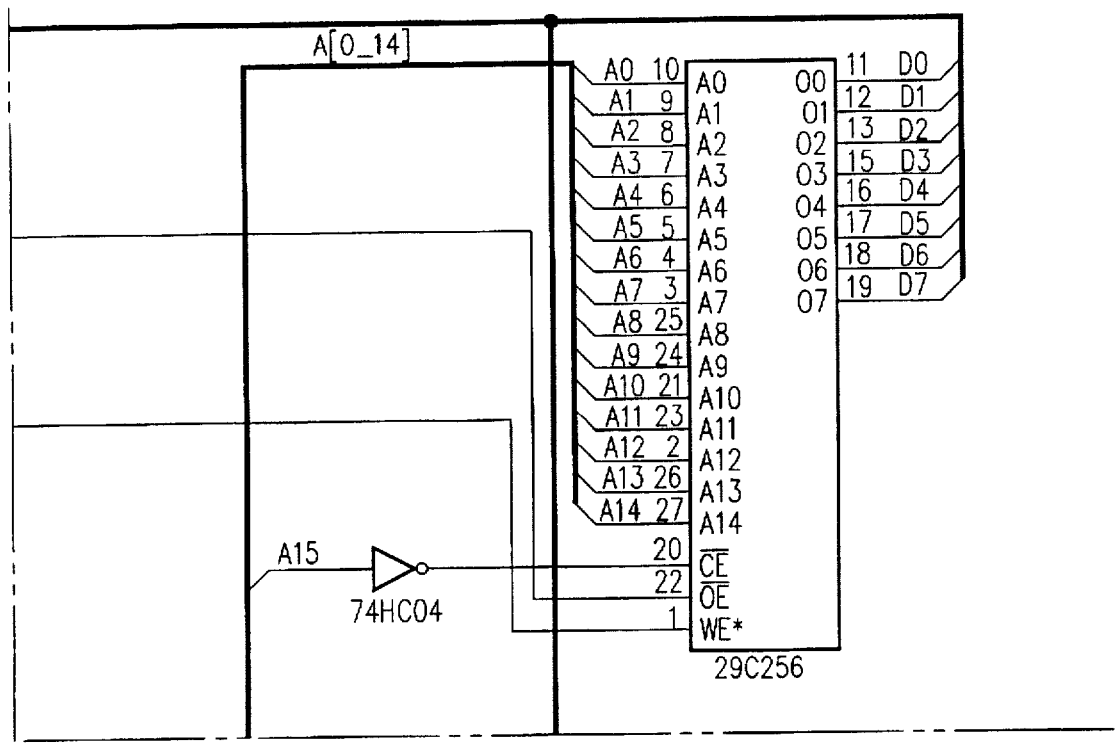
Figures 2, 9B:
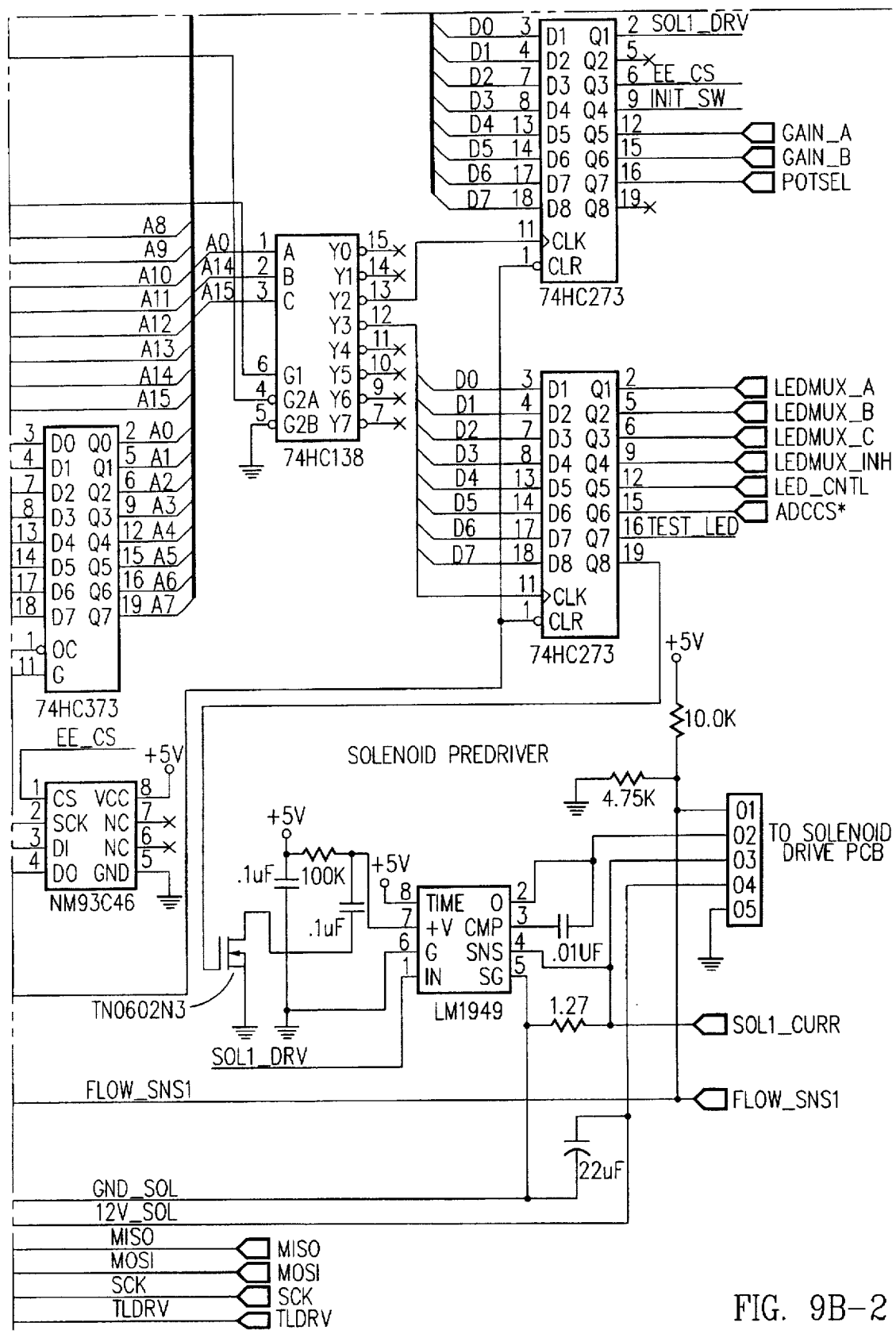

FIGS. 7A, 7B, 8A, 8B, 9A-1, 9A-2, 9B-1 and 9B-2 are circuit diagrams of a specific embodiment of a spray device. The LED banks (light emitting diodes) 100, 101 and 102 in FIGS. 8A and 8B emit radiation of 600 nm, 670 nm and 750 nm, respectively. The photodetector 103 in FIG. 7A is the main photodetector that detects reflected radiation. The inductor and capacitor 104 in FIG. 7A are tuned to the 455 kHz frequency at which the LEDs are modulated on/off. LED 105 of FIG. 7A is a test LED placed near the main photodetector 103. Photodetector 106 is a test photodetector placed near the LEDs 100, 101 and 102. An indication of the relative reflectivities at two wavelengths is present in the form of a phase of a signal output by FM detector 107. One such phase can be compared with a second such phase by microcontroller 108 to determine a value indicative of a change in slope of a reflectance characteristic. In one embodiment, FM detector 107 is commercially available from Philips Semiconductor of Sunnyvale, Calif., as part number NE614A.

Figure 10:
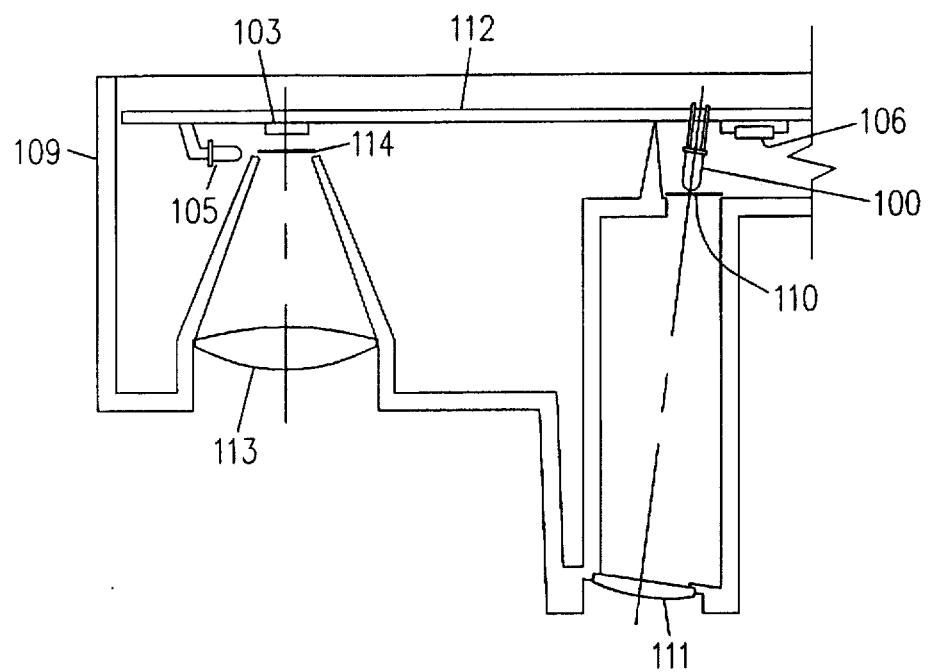
FIG. 10 is a cross-sectional diagram of a spray device showing the test photodetector and test LED in accordance with a specific embodiment.

FIG. 10 is a cross-sectional diagram of a spray device showing the test photodetector 106 and test LED 105 in accordance with a specific embodiment. This spray device includes a housing 109, main LEDs 100, test photodetector 106, an LED mask 110, an LED lens 111, a printed circuit board 112, main photodetector 103, test LED 105, a detector lens 113, and a detector mask 114. To determine a reflectivity value in accordance with some embodiments, a value indicative of the intensity of detected radiation reflected from objects in the field of view is divided by a value indicative of the intensity of light incident on objects in the field of view.

Test photodetector 106 can be used to determine the magnitude of current that would flow through the main photodetector 103 for 100 percent reflectance (i.e., the magnitude of photodetector current corresponding with the intensity of radiation incident on objects in the field of view). The LEDs 100 are turned on (modulated on/off) as they would be to detect reflectance and a highly reflective material is placed in the field of view at the distance at which objects would be when the spray device is in use in the field. A white piece of paper can, for example, be considered to be nearly 100 percent reflective. With such a piece of paper in the field of view, the current flowing through the main photodetector 103 is detected as is the current flowing through the test photodetector 106 (a small amount of radiation from LEDs 100 reflects off the LED mask 110 and into the test photodetector 106). The magnitudes of these two currents are stored in microcontroller 108. The magnitude of the current flowing through test photodetector 106 in later measurements can then be used as an indication of the intensity of radiation incident on objects in the field of view.

If, for example, the current magnitude flowing through test photodetector 106 is the current measured in the test photodetector 106 when the white paper was in the field of view, then it is assumed that the intensity of incident light is the same as it was when the white paper was in the field of view. It is also assumed that the current detected in the main photodetector when the white paper was in the field of view corresponds with 100 percent reflectance. In some embodiments, microcontroller 108 uses test photodetector 106 and digital potentiometers 106A (part no. DS 1267 available from Dallas Semiconductor of Dallas, Tex.) to control the drive current for each of the three banks of LEDs 100, 101 and 102 such that the intensities of radiation emitted at each wavelength is the same. Test photodetector 106 therefore also compensates for the effects of aging and temperature on the LEDs.

Test LED 105 is provided for a power up test to determine whether main photodetector 103 detects light incident on it. If main photodetector 103 does not output current when test LED 105 is on, then an error is detected.

In some embodiments, microcontroller 108 detects the drive current flowing through each bank of LEDs to ensure that the drive current is within acceptable limits. In this way, microcontroller 108 detects failed banks of LEDs (shorts or opens). To detect LED current flow, microcontroller 108 detects the voltages dropped over resistors 115 via analog multiplexer 116.

Although the present invention is described in connection with certain specific embodiments for instructional purposes, the present invention is not limited thereto. For example, a reflectivity value is determined by dividing the intensity of detected reflected radiation for a wavelength by the intensity of radiation transmitted at that wavelength and then taking the logarithm of the result. In other embodiments, a function other than the logarithm is used. In some embodiments, the value D indicative of a change in slope of a reflectance characteristic is determined by taking a ratio of the values D1 and D2 rather than the difference. The change in slope of the reflectance characteristic can be with respect to two portions of the reflectance characteristic that are separated from one another. More than four reflectivity values can be used. Any suitable structure for generating the reflectivity values and generating the value D can be used. The specific structure set forth in U.S. Pat. No. 5,296,702 need not be used. Techniques and structures set forth in the following two patent applications can be used: U.S. patent application Ser. No. 08/276,002, entitled "Apparatus And Method For Determining A Distance To An Object In A Field For The Controlled Release of Chemicals On Plants, Weeds, Trees Or Soil And/Or Guidance Of Farm Vehicles", filed Jul. 15, 1994, by James L. Beck and Malcolm L. Kinter; and U.S. patent application Ser. No. 08/626, 857, entitled "Apparatus And Method For Spraying Herbicide On Weeds In A Cotton Field", filed Apr. 3, 1996, by James L. Beck and Malcolm L. Kinter (the subject of the two patent applications listed above is incorporated herein by reference). Accordingly, various modifications, adaptations, and combinations or various features of the described embodiments can be practiced without departing from the scope of the invention as set forth in the claims.

What is claimed is:

1. A method, comprising the steps of:
   (a) detecting radiation of a first wavelength reflected off an object in a field and generating a first reflectivity value A therefrom;
   (b) detecting radiation of a second wavelength reflected off said object and generating a second reflectivity value B therefrom;
   (c) detecting radiation of a third wavelength reflected off said object and generating a third reflectivity value C therefrom;
   (d) determining a value D indicative of a change in slope of a reflectance characteristic of said object using said first reflectivity value A, said second reflectivity value B and said third reflectivity value C; and
   (e) performing an agricultural activity with respect to said object using said value D, said steps (a) through (e) being performed in an agricultural implement.

2. The method of claim 1, further comprising the step of:
   (f) moving said agricultural implement with respect to said field.

3. The method of claim 1, further comprising the steps of:
   (f) transmitting, from said agricultural implement, radiation of said first wavelength toward said object such that some of said radiation reflects off said object and is detected in step (a);
   (g) transmitting, from said agricultural implement, radiation of said second wavelength toward said object such that some of said radiation reflects off said object and is detected in step (b); and
   (h) transmitting, from said agricultural implement, radiation of said third wavelength toward said object such that some of said radiation reflects off said object and is detected in step (c).

4. The method of claim 1, wherein step (d) comprises the steps of:
   determining a first value D1 indicative of a slope of a portion of said reflectance characteristic of said object between said first wavelength and said second wavelength using said first reflectivity value A and said second reflectivity value B; and
   determining a second value D2 indicative of a slope of a portion of said reflectance characteristic of said object between said second wavelength and said third wavelength using said second reflectivity value B and said third reflectivity value C.

5. The method of claim 4, wherein said step (d) involves determining if said first value D1 differs from said second value D2 by more than a predetermined amount.

6. The method of claim 4, wherein step (d) further comprises determining said value D by subtracting one of said values D1 and D2 from the other.

7. The method of claim 4, wherein step (d) further comprises determining said value D by comparing one of said values D1 and D2 to the other.

8. The method of claim 4, wherein step (d) further comprises determining said value D by taking of a ratio of said values D1 and D2.

9. The method of claim 4, wherein said value D1 is determined by subtracting one of said values A and B from the other, and wherein said value D2 is determined by subtracting one of said values B and C from the other.

10. The method of claim 3, wherein said first reflectivity value A is generated by digitizing a magnitude of a current flowing through a photodetector to obtain a first value A1 and then dividing said first value A1 by a value A2 indicative of an intensity of said radiation of said first wavelength transmitted in step (f).

11. The method of claim 10, wherein said first reflectivity value A is a function of A1 and A2.

12. The method of claim 11, wherein said first reflectivity value A is log(A1/A2).

13. The method of claim 1, wherein said value D is positive if said change in slope is a positive change, and wherein said determination of whether to perform an agricultural activity in step (e) is made using information indicative of whether said value D is positive.

14. The method of claim 1, wherein said agricultural activity is taken from the group consisting of: application of herbicide, application of pesticide, application of fertilizer, application of nutrients, operation of an automatic hoe, operation of an electronically-controlled solenoid valve, guidance of a vehicle through said field, and mapping of said object in said field.

15. The method of claim 1, wherein said change in slope is a change between a slope of a first portion of said reflectance characteristic and a slope of a second portion of said reflectance characteristic, said first portion being separated from said second portion.

16. The method of claim 1, further comprising the step of:
   (c1) detecting radiation of a fourth wavelength which reflected off said object in said field and generating a fourth reflectivity value C1 therefrom,
   and wherein said step (d) involves using said first reflectivity value A and said second reflectivity value B to determine a value D1 indicative of a slope of a first portion of said reflectance characteristic, and involves using said third reflectivity value C and said fourth reflectivity value C1 to determine a value D2 indicative of a slope of a second portion of said reflectance characteristic, said first portion being separated from said second portion.

17. An agricultural implement, comprising:
   a spray valve; and
   means for determining a value D indicative of a change in slope of a reflectance characteristic of an object in a field using a first reflectivity value A, a second reflectivity value B and a third reflectivity value C, said means also being for determining whether said value D is indicative of a plant and for opening said spray valve to spray said object if said value D is indicative of a plant.

18. The agricultural implement of claim 17, further comprising:
   a source of substantially monochromatic radiation of a first wavelength;
   a source of substantially monochromatic radiation of a second wavelength; and
   a source of substantially monochromatic radiation of a third wavelength.

19. The agricultural implement of claim 17, wherein said means determines said value D is indicative of a plant if said value D is greater than a predetermined threshold value.

* * * * *